United States Patent
Rouleau et al.

(10) Patent No.: US 10,544,821 B2
(45) Date of Patent: *Jan. 28, 2020

(54) SELF-LOCKING INSERT

(71) Applicant: STEERING SOLUTIONS IP HOLDING CORPORATION, Saginaw, MI (US)

(72) Inventors: James E. Rouleau, Burt, MI (US); Shawn A. Haring, Swartz Creek, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 43 days.

This patent is subject to a terminal disclaimer.

(21) Appl. No.: 15/334,754

(22) Filed: Oct. 26, 2016

(65) Prior Publication Data

US 2017/0045079 A1 Feb. 16, 2017

Related U.S. Application Data

(62) Division of application No. 14/278,702, filed on May 15, 2014, now Pat. No. 9,506,495.

(60) Provisional application No. 61/838,015, filed on Jun. 21, 2013.

(51) Int. Cl.
*F16B 39/22* (2006.01)
*F16B 39/286* (2006.01)

(52) U.S. Cl.
CPC .................. *F16B 39/286* (2013.01)

(58) Field of Classification Search
CPC ......... F16B 39/286; F16B 39/06; F16H 25/24

USPC ....... 411/207, 208, 211, 217, 221, 272, 178, 411/179, 182, 103, 108, 112, 114, 305, 411/308, 293, 295, 332, 216, 104, 115, 411/124, 134, 166, 176, 970, 172–175, 411/302

See application file for complete search history.

(56) References Cited

U.S. PATENT DOCUMENTS

| | | | |
|---|---|---|---|
| 996,540 A | 6/1911 | Thomshaw | |
| 1,158,260 A | 10/1915 | Moerbe | |
| 1,363,710 A | 12/1920 | Best | |
| 1,368,896 A * | 2/1921 | Chambley | E02D 5/54 405/254 |
| 1,855,482 A * | 4/1932 | McArthur | E05B 1/0015 16/108 |
| 2,240,425 A * | 4/1941 | Sternbergh | F16B 19/004 411/432 |
| 2,400,318 A | 5/1946 | Rosan | |
| 2,444,145 A | 6/1948 | Rosan | |
| 2,657,862 A * | 11/1953 | Carlson | F02M 1/10 236/101 C |
| 2,748,824 A | 6/1956 | Brill | |
| 2,956,358 A | 10/1960 | Pennington | |

(Continued)

*Primary Examiner* — Gary W Estremsky

(57) ABSTRACT

A self-locking insert includes an insert body having an outer surface. Also included is a bore extending through the insert body, the bore defining an inner surface and configured to receive a lead screw. Further included is a self-locking feature configured to engage a holder to retain the self-locking insert in a predetermined position, the self-locking feature comprising at least one lug configured to be compressed by the holder during installation of the self-locking insert in the holder, the self-locking insert configured to be pressed into position in the holder. Yet further included is a de-lashing feature configured to interference fittingly engage the holder.

2 Claims, 5 Drawing Sheets

(56) References Cited

U.S. PATENT DOCUMENTS

| | | | |
|---|---|---|---|
| 2,958,358 A | 11/1960 | Neuschotz | |
| 3,194,107 A * | 7/1965 | Baliard | F16B 37/02 29/509 |
| 3,213,746 A * | 10/1965 | Dwyer | F16B 13/06 411/15 |
| 3,269,251 A * | 8/1966 | Bass | F16B 37/122 411/21 |
| 3,270,792 A | 9/1966 | Neuschotz | |
| 3,276,499 A * | 10/1966 | Reusser | B23P 19/062 29/432 |
| 3,280,874 A | 10/1966 | Rosan | |
| 3,449,799 A * | 6/1969 | Bien | F16B 37/043 411/437 |
| 3,750,259 A | 8/1973 | Timmons | |
| 4,005,740 A | 2/1977 | Villo et al. | |
| 4,133,245 A | 1/1979 | Ruihley | |
| 4,610,589 A * | 9/1986 | Bredal | F16B 19/004 411/180 |
| 4,715,757 A | 12/1987 | Edminster | |
| 4,729,606 A * | 3/1988 | Narita | B60B 7/14 24/297 |
| 4,749,318 A * | 6/1988 | Bredal | F16B 37/122 411/180 |
| 4,828,441 A * | 5/1989 | Frasca | F01D 25/243 403/21 |
| 4,854,844 A * | 8/1989 | Carlsen | B29C 47/165 264/40.1 |
| 4,890,966 A * | 1/1990 | Umezawa | F16B 13/0808 24/289 |
| 4,898,493 A * | 2/1990 | Blankenburg | F16B 21/088 403/326 |
| 4,952,107 A | 8/1990 | Dupree | |
| 4,978,265 A * | 12/1990 | De Wan | F16B 13/005 411/182 |
| 5,065,490 A * | 11/1991 | Wivagg | F16B 19/1081 24/297 |
| 5,106,225 A | 4/1992 | Andre et al. | |
| 5,616,052 A * | 4/1997 | Pan | F16B 37/043 411/182 |
| 5,632,584 A * | 5/1997 | Acevedo | F16B 37/043 411/182 |
| 5,704,752 A | 1/1998 | Logerot | |
| 5,871,319 A | 2/1999 | Schneider | |
| 5,919,019 A | 7/1999 | Fischer | |
| 5,990,382 A * | 11/1999 | Fox | A61B 10/00 623/16.11 |
| 5,993,128 A * | 11/1999 | Mark | F16B 13/124 411/30 |
| 6,155,741 A * | 12/2000 | Took | E06C 7/086 403/260 |
| 7,563,993 B2 | 7/2009 | Drotleff | |
| 7,993,084 B2 * | 8/2011 | Hitchcock | F16B 19/1081 411/45 |
| 8,075,234 B2 * | 12/2011 | McClure | F16B 19/1081 411/71 |
| 8,894,340 B2 * | 11/2014 | Kamiya | F16B 5/0642 24/292 |
| 8,939,690 B2 * | 1/2015 | Kuhm | F16B 41/002 411/182 |
| 2008/0031702 A1 | 2/2008 | Chen | |
| 2008/0240631 A1 * | 10/2008 | Keller | F16C 33/08 384/91 |

* cited by examiner

SELF-LOCKING INSERT

CROSS-REFERENCES TO RELATED APPLICATIONS

This patent application is a divisional application of U.S. patent application Ser. No. 14/278,702, filed May 15, 2014, which claims priority to U.S. Provisional Patent Application Ser. No. 61/838,015 filed Jun. 21, 2013, both of which are incorporated herein by reference in their entireties.

BACKGROUND OF THE INVENTION

The present invention relates to a self-locking insert, and more particularly, a self-locking insert for use in conjunction with a linear actuator.

A linear actuator may include a threaded insert made of a polymer material and a power screw. The threaded insert may provide smooth, long lived and quiet running threads. The threads run on the power screw and may provide lash-free and efficient conversion of rotary motion to linear motion. In a lash-free arrangement, the threads of one piece are tightly fit with the threads of a corresponding piece to reduce lost motion between the two threaded parts.

In order to retain the threaded insert in a holder, such as a nut, tube, or other containing structure, a specialized process or additional part is often used. For example, a connection between the threaded insert and holder may be accomplished by over-molding the insert, staking of the insert, or using an additional retaining device such as a metal clip.

Accordingly, it is desirable to provide a self-locking insert which may be installed in a holder without using a specialized process or additional parts or components.

SUMMARY OF THE INVENTION

According to an embodiment of the invention, a self-locking insert includes an insert body having an outer surface. Also included is a bore extending through the insert body, the bore defining an inner surface and configured to receive a lead screw. Further included is a self-locking feature configured to engage a holder to retain the self-locking insert in a predetermined position, the self-locking feature comprising at least one lug configured to be compressed by the holder during installation of the self-locking insert in the holder, the self-locking insert configured to be pressed into position in the holder. Yet further included is a de-lashing feature configured to interference fittingly engage the holder.

According to another embodiment of the invention, a linear actuator includes a holder. Also included is a lead screw configured to be rotated. Further included is a self-locking insert. The self-locking insert includes an insert body having an outer surface. The self-locking insert also includes a bore extending through the insert body, the bore defining an inner surface having inner thread to receive the lead screw while interfacing with threads of the lead screw. The self-locking insert further includes a self-locking feature engaging the holder to retain the self-locking insert in a predetermined position, the self-locking feature comprising at least one lug configured to be compressed by the holder during installation of the self-locking insert in the holder, the self-locking insert configured to be pressed into position in the holder. The self-locking insert yet further includes a de-lashing feature in an interference fit engagement with the holder.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a self-locking insert 100 is provided. In an exemplary embodiment, the self-locking insert 100 is made of a polymer material, such as a thermoplastic.

Figure 1:
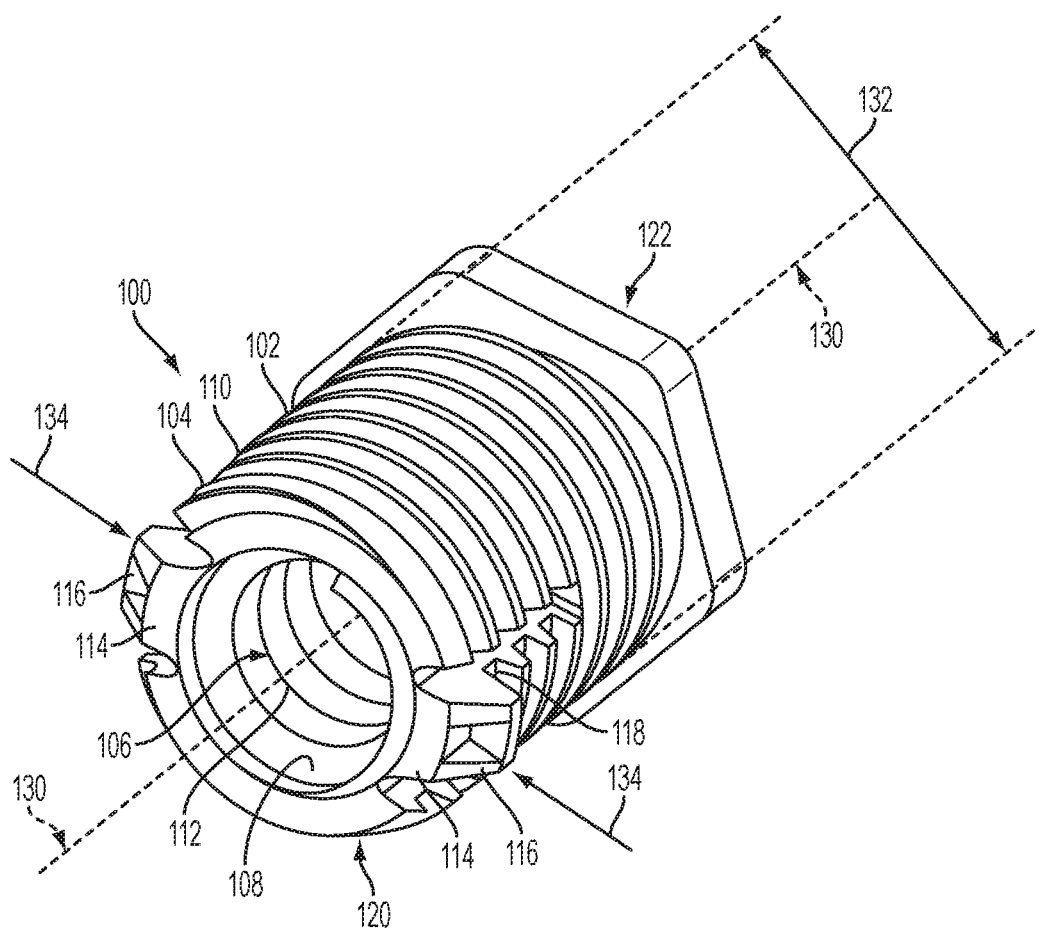
FIG. 1 shows a self-locking insert according to an exemplary embodiment of the present invention.
Figure 2:
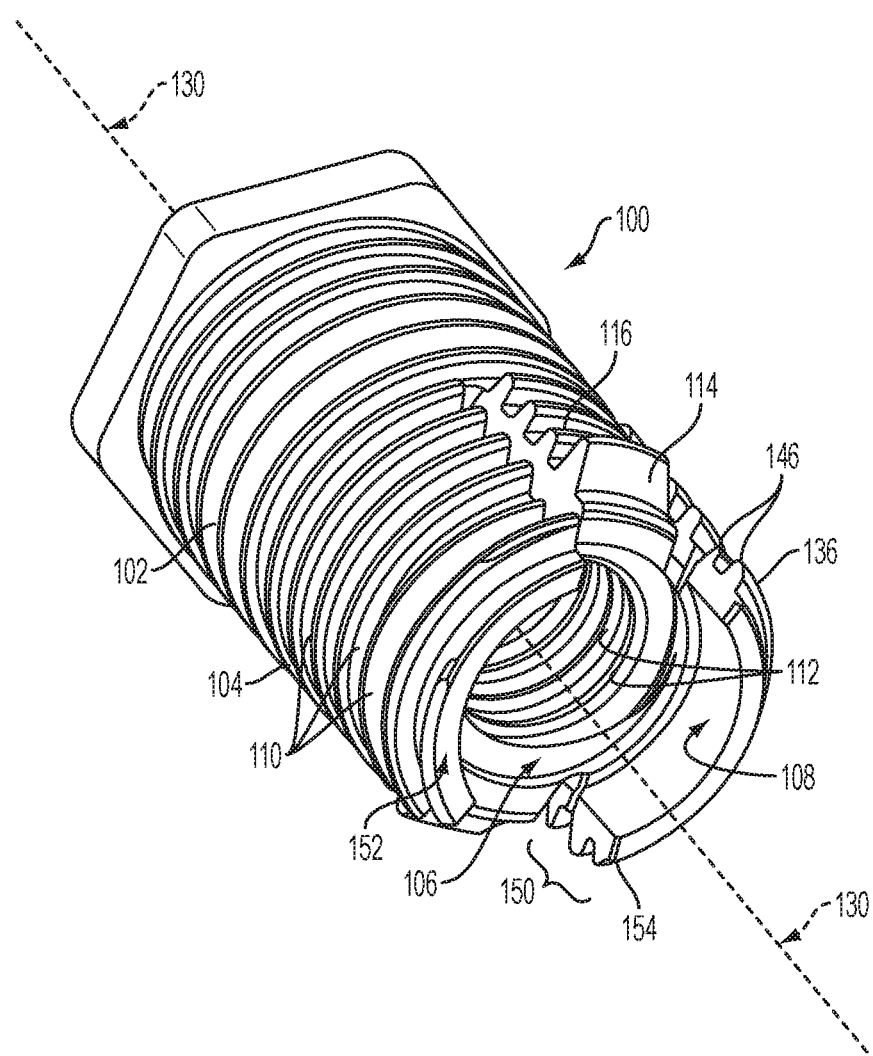
FIG. 2 shows a self-locking insert according to an exemplary embodiment of the present invention.
Figure 4:
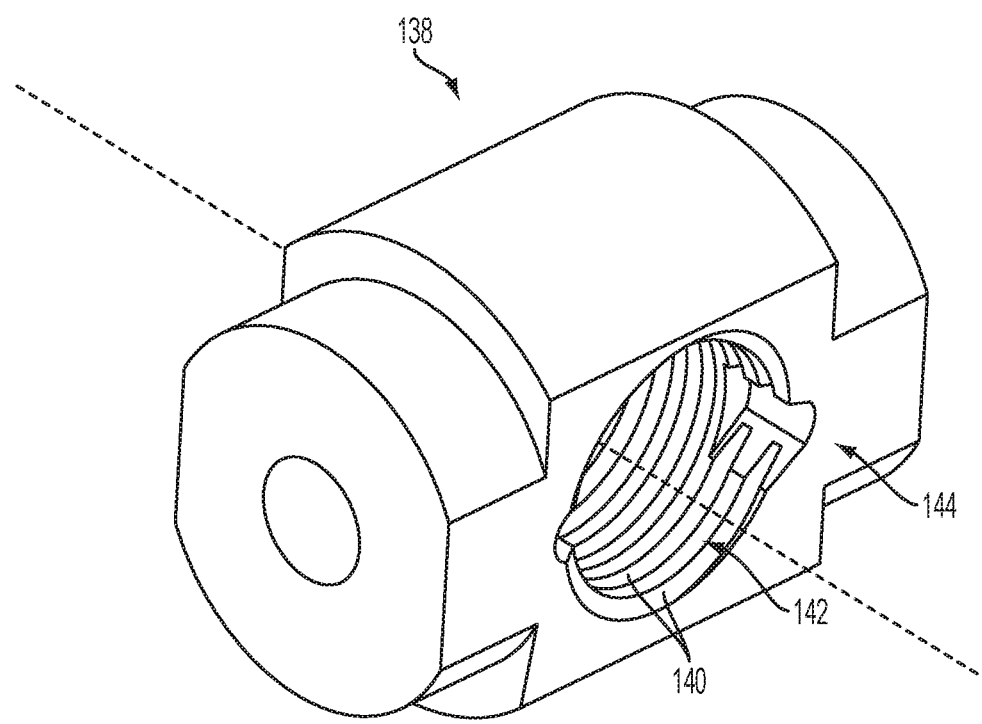
FIG. 4 shows a structural holder for use with a self-locking insert according to an exemplary embodiment of the present invention.

With reference to the exemplary embodiment shown in FIGS. 1 and 2, the self-locking insert 100 includes an insert body 102 having an outer surface 104 and an internal insert bore 106 defining an inner surface 108 and a central insert axis 130. External insert threads 110 are positioned on the outer surface 104 of the self-locking insert 100, and internal threads 112 are positioned on the inner surface 108. The external insert threads 110 may be used to secure the self-locking insert 100 into a structural holder 138 (FIG. 4). In an exemplary embodiment, the external insert threads 110 define an outer diameter 132 of the self-locking insert 100. Attributes of the external insert threads 110, including the outer diameter 132, are configured so as to interface with the internal holder threads 140 that are disposed on a holder bore 142 defined within the structural holder 138.

Figure 3:
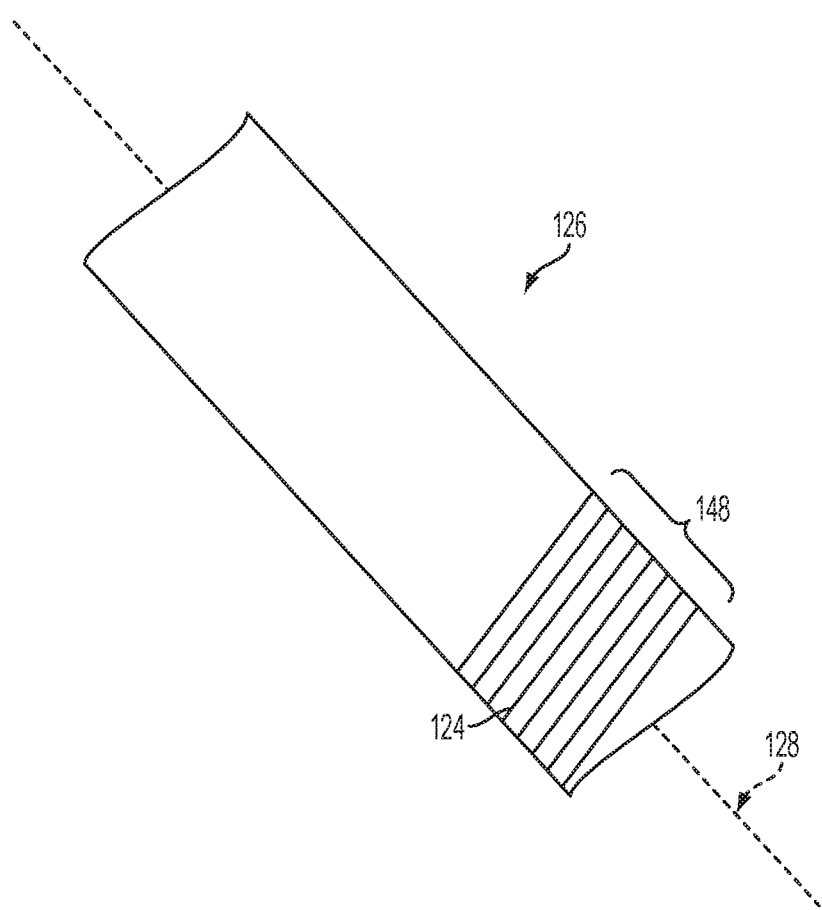
FIG. 3 shows a lead screw for use with a self-locking insert according to an exemplary embodiment of the present invention.

The internal threads 112 of the self-locking insert 100 are configured to interface with external actuator threads 124 that are disposed on a lead screw portion 148 of a mating component such as a linear actuator 126 (FIG. 3). Thus, the threaded interface between the lead screw portion 148 of a linear actuator 126 and the internal threads 112 of the self-locking insert 100 facilitate control over linear movement (i.e., movement along the central actuator axis 128) of the linear actuator 126 relative to the self-locking insert 100 by rotation of the linear actuator 126 about its central actuator axis 128.

The self-locking insert 100 further includes a self-locking feature 114. In an exemplary embodiment, the self-locking feature 114 includes one or more lugs 116. The lugs 116 may be distributed about the self-locking insert 100. For example, in embodiments having two lugs 116, the lugs 116 may be disposed opposite one another, i.e., at 180 degrees from one another. The lugs 116 are positioned on the self-locking insert 100 and configured so that, in a deployed state, the lugs 116 extend outwardly from the outer diameter 132 to define a deployed diameter 134 that is greater than the outer diameter 132. The lugs 116 are also configured to flex resiliently such that the lugs 116 may be compressed to a retracted state wherein the lugs 116 may fit within the outer diameter 132. Thus, in the retracted state, the lugs 116 define a retracted diameter that is less than or equal to the outer diameter 132, allowing the self-locking insert 100 to be threaded into the holder bore 142 defined in the structural holder 138 during installation of the self-locking insert 100 into the structural holder 138.

In an exemplary embodiment, the lugs 116 are configured so that, when occupying the retracted state, their inner diameter is less than an internal diameter defined by the internal threads 112. Accordingly, the installation of the lead screw into the internal insert bore 106 causes the lugs 116 to occupy their deployed state. In an exemplary embodiment, the lugs 116 are cantilevered from the self-locking insert 100 so as to be biased toward their deployed state.

The structural holder 138 defines two or more pockets 144, each being disposed and configured so as to receive a respective lug 116 in its deployed state. Thus, when each of the lugs 116 is in a deployed state so as to occupy a respective one of the pockets 144, the lugs 116 serve to interfere with rotation of the self-locking insert 100 relative to the structural holder 138. It should be appreciated that the structural holder 138 may be fixed to another component, whose movement the linear actuator 126 is intended to cause.

As described more fully below, the self-locking insert 100 may be threaded into the holder or pressed into the holder depending upon the nature of the outer surface 104 of the self-locking insert 100 and the inner surface of the holder bore 142.

Once the self-locking insert 100 is installed in the holder 138, the lead screw 148 may be installed through the self-locking insert 100. In an exemplary embodiment, installation of the lead screw 148 within the internal insert bore 106 of the self-locking insert 100 drives the lugs 116 into position within the pockets 144 of the holder 138, thereby locking the self-locking insert 100 in place. That is, the lead screw 148, when installed in the internal insert bore 106, drives the lugs 116 of the self-locking insert 100 to a deployed position wherein there is insufficient clearance between the lead screw 148 and the holder 138 for the lugs 116 to pass (either rotationally about the axis 13 or linearly along the axis 130). In an exemplary embodiment, the lead screw 148 drives the lugs 116 in a radially outward direction to be pressed against the holder 138. Accordingly, the lugs 116, once deployed, may prevent the self-locking insert 100 from unscrewing (i.e., rotating about the axis 130) or otherwise moving axially (i.e., translating along the axis 130) relatively to the holder 138.

The self-locking feature 114 described above is provided as a non-limiting example. Other suitable configurations may be used as well. For example, the number of lugs 116 may be varied so as to provide a desired level of retention strength for retaining the self-locking insert 100 within the holder 138. Accordingly, in various exemplary embodiments, the self-locking feature 114 may include a single lug 116, or three or more lugs 116 on the self-locking insert 100.

The self-locking insert 100 further includes a de-lashing feature 118. The de-lashing feature 118 is implemented to provide a snug connection between the self-locking insert 100 and the holder 138.

In an exemplary embodiment, the de-lashing feature 118 is implemented on the lugs 116 of the self-locking feature 114. For example, the de-lashing feature 118 may be formed as an angle on a surface of the lugs 116 that is pressed against the holder. The angle on this surface works as an interference fit feature and allows the self-locking insert 100 to have limited or no lash relative to the holder 138. The angle of this surface may be determined by the size of the lug 116, material choice and/or the tolerance of the length of the holder 138.

Figure 5:
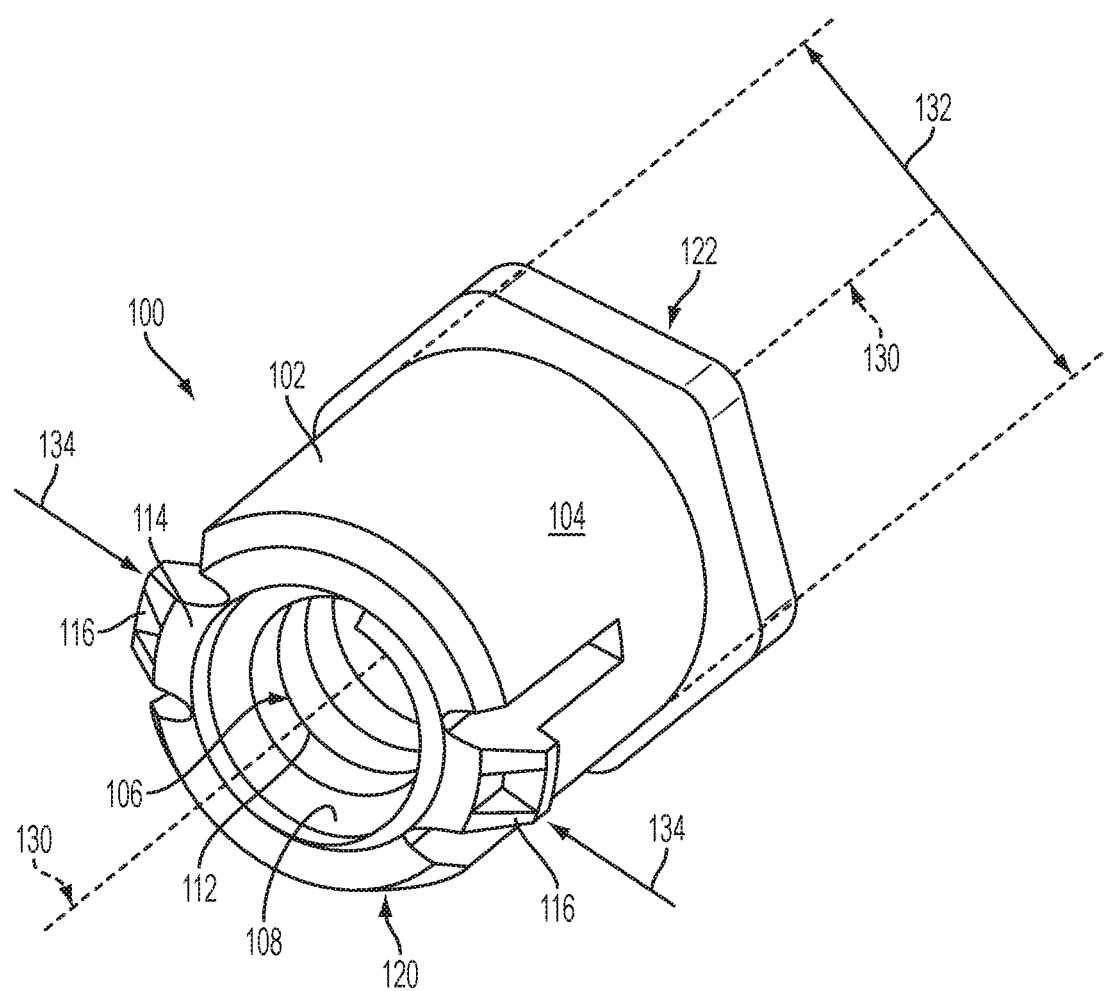
FIG. 5 shows a self-locking insert according to an exemplary embodiment of the present invention.

It is understood that the self-locking insert 100 is not limited to the exemplary embodiments described above. For example, in the exemplary embodiments above, the external insert threads 110 are used to provide increased strength in the assembly. However, in another exemplary embodiment, the self-locking insert 100 may be pressed into place rather than threaded into place, as shown in FIG. 5. Thus, in this alternative embodiment, the outer surface 104 may of the self-locking insert 100 may be unthreaded.

In the alternative configuration wherein the outer surface 104 is unthreaded, the self-locking insert 100 includes an anti-rotation feature. The anti-rotation feature may be positioned on the body of the self-locking insert 100. Alternatively, the anti-rotation feature may be part of the self-locking feature 114. Such an anti-rotation feature is configured to prevent rotation of the self-locking insert 100 about the central insert axis 130 within the holder bore 142 of the structural holder 138, in which the self-locking insert 100 is installed. Accordingly, the self-locking insert 100 is prevented from moving axially relative to the holder and from rotating in the holder bore 142 relative to the holder. Exemplary anti-rotation features may comprise one or more cooperating ridges or keyways disposed and defined in the outer surface 104 of the self-locking insert 100 and the inner surface 108 of the holder. Alternatively, the lugs 116 may cooperate with corresponding features of the holder to prevent relative rotation of the parts.

The self-locking insert 100 may be constructed using various methods. In an exemplary embodiment, the self-locking insert 100 is designed as an injection-moldable component and may be manufactured in a high volume plastic molding machine. Variants of the self-locking insert 100 allow the self-locking insert 100 to be molded from either a lug end 120 or a driven end 122.

In the exemplary embodiments above, the self-locking insert 100 may be screwed or pressed into position within the holder 138. In addition, the self-locking insert 100 may be used in combination with a linear actuator 126 including a lead screw 148 and a holder 138. The self-locking insert 100 may be retained in the holder 138 by the lugs 116 of the self-locking feature 114. Accordingly, the self-locking insert 100 may be retained in the holder 138 without any additional components or parts or the use of any specialized processes.

To simplify assembly of the self-locking insert 100 into a structural holder 138, it may be advantageous to provide an extended thread leader 150 at a leading edge 152 of the body 102 of the self-locking insert 100 so as to reduce the number of required assembly processes. For example, exemplary embodiments of the above-described insert 100 as shown in FIG. 1 may impose multiple assembly requirements such as that: (1) the lugs 116 be compressed to facilitate passage through the holder; and (2) the external insert threads 110 of the self-locking insert 100 be started onto internal threads 112 of the holder 138 (or other cooperating features such as anti-rotation features of the self-locking insert 100 and the holder 138 must be at least partially mated for further assembly) must be simultaneously satisfied, tending to complicate the assembly process. One exemplary method for simultaneously satisfying these requirements is to provide a jig or fixture (not shown) to allow one of the two operations to be completed prior to the second. After the second operation is complete, the jig or fixture may be removed, and the intended assembly is complete.

Alternatively, in an exemplary embodiment, the above-described simultaneous assembly processes may be separated into the two events by providing an extended thread leader 150 attached to the body 102 of the self-locking insert 100 at a leading edge 152 of the body 102 of the self-locking insert 100. The extended thread leader 150 may be used during assembly of the self-locking insert 100 into the structural holder 138 and subsequently detached from the body 102 following installation of the self-locking insert 100 into the structural holder 138. As a result, the two operations associated with first threading the self-locking insert 100 into the structural holder 138 and secondly retracting the lugs 116 may be separated temporally, thereby eliminating the need for special jigs or fixtures that might otherwise be necessary to facilitate the retraction of the lugs 116 while the self-locking insert 100 is threaded into the holder bore 142. After the parts are assembled, the extended thread leader 150 may be removed from the body 102 of the self-locking insert 100, allowing the part to satisfy the separation of tasks without violating size or clearance constraints that might be present in particular applications.

In accordance with this embodiment, the extended thread leader 150 provides a threaded extension 136 of the external insert threads 110 of the body 102. The extension threads 146 of the threaded extension 136 may start with a dog point 154 to allow easy assembly. During assembly, these extension threads 146 of the threaded extension 136 are started first, separating the screwing operation from the retraction and ultimate deployment of the lug 116. As the threaded body 102 is rotated, the extended thread leader 150 enables the body 102 to be pulled into the threaded bore 142 without resistance that would otherwise be caused by the retraction of the lugs 116. Subsequently, as a second operation, the continued rotation of the threaded body 102, that is associated with the continued threading of the body 102 into the structural holder 138, causes the lugs 116 to be deflected so as to occupy their retracted state. At a later time, the threaded extension 136, with the extension threads 146, may be detached from the body 102 of the self-locking insert 100.

Annular undercuts and, optionally, stress risers are used to promote the easy separation of the extension threads 146 of the threaded extension 136, allowing the threaded extension 136 to be overstressed to snap the threaded extension 136 free from the body 102. Other means such as machining, cutting, abrading, or nibbling may be used to mechanically remove the expendable extended thread leader 150. Alternate designs, including perforations may be placed strategically between the leading edge 152 and the extended thread leader 150 to better facilitate removal of the extended thread leader 150 from the body 102.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A self-locking insert comprising:
an insert body having a cylindrical outer surface defining a circular cross-section along a length of the insert body;
a bore extending through the insert body, the bore defining an inner surface having an inner thread and configured to receive a lead screw in a threaded manner with the inner thread of the inner surface of the bore;
a self-locking feature configured to engage a holder to retain the self-locking insert in a predetermined axial and circumferential position, the self-locking feature comprising at least one lug configured to be compressed by the holder during installation of the self-locking insert in the holder, the self-locking insert configured to be pressed into position in the holder, the at least one lug being an anti-rotation feature, the at least one lug extending radially outward to a radial distance greater than the cylindrical outer surface of the insert body; and
a de-lashing feature on the at least one lug of the self-locking feature, the de-lashing feature being an angle formed on a surface of the at least one lug that is pressed against the holder to interference fittingly engage the holder.

2. A linear actuator comprising:
a holder;
a lead screw configured to be rotated; and
a self-locking insert, the self-locking insert comprising:
an insert body having a cylindrical outer surface defining a circular cross-section along a length of the insert body, the insert body being a single, integrally formed component;
a bore extending through the insert body, the bore defining an inner surface having inner thread to receive the lead screw while interfacing with threads of the lead screw;
a self-locking feature engaging the holder to retain the self-locking insert in a predetermined axial and circumferential position, the self-locking feature comprising at least one lug configured to be compressed by the holder during installation of the self-locking insert in the holder, the self-locking insert configured to be pressed into position in the holder, the at least one lug being an anti-rotation feature; and
a de-lashing feature on the at least one lug of the self-locking feature, the de-lashing feature being an angle formed on a surface of the at least one lug that is pressed against the holder in an interference fit engagement with the holder.

* * * * *